(12) United States Patent
Matsuzaki et al.

(10) Patent No.: US 7,980,638 B2
(45) Date of Patent: Jul. 19, 2011

(54) BRAKE CONTROLLER

(75) Inventors: Norikazu Matsuzaki, Minamiarupusu (JP); Toshiyuki Innami, Mito (JP); Kimio Nishino, Minamiarupusu (JP); Masayuki Kikawa, Kai (JP)

(73) Assignee: Hitachi Automotive Systems, Ltd., Hitachinaka-Shi (JP)

( * ) Notice: Subject to any disclaimer, the term of this patent is extended or adjusted under 35 U.S.C. 154(b) by 0 days.

(21) Appl. No.: 12/856,087

(22) Filed: Aug. 13, 2010

(65) Prior Publication Data

US 2011/0073419 A1 Mar. 31, 2011

(30) Foreign Application Priority Data

Sep. 30, 2009 (JP) .................................. 2009-225898

(51) Int. Cl.
*B60T 8/44* (2006.01)
(52) U.S. Cl. .................................................. 303/114.1
(58) Field of Classification Search .......... 188/358–361; 303/114.1, 115.1, 115.2, 191–192
See application file for complete search history.

(56) References Cited

U.S. PATENT DOCUMENTS

| | | | | | |
|---|---|---|---|---|---|
| 5,236,257 | A | * | 8/1993 | Monzaki et al. | 303/114.1 |
| 6,877,821 | B2 | * | 4/2005 | Yokoyama et al. | 303/115.2 |
| 7,367,187 | B2 | * | 5/2008 | Ikeda et al. | 60/545 |
| 7,823,384 | B2 | * | 11/2010 | Ikeda et al. | 60/545 |
| 2004/0183373 | A1 | * | 9/2004 | Yonemura et al. | 303/191 |
| 2005/0200196 | A1 | * | 9/2005 | Fulks et al. | 303/115.1 |

FOREIGN PATENT DOCUMENTS

JP 2006-306350 A 11/2006

* cited by examiner

*Primary Examiner* — Christopher P Schwartz
(74) *Attorney, Agent, or Firm* — Crowell & Moring LLP

(57) ABSTRACT

In a brake controller, a slope climbing vehicle stop detecting means determines when the vehicle is stopped while climbing a slope, and a pedal release detecting means determines that the pedal is released. An assist control unit interpolates a decrement in brake fluid pressure in the master cylinder due to an input piston movement caused by a release of a brake pedal. An assist piston is controlled by an electric motor to restore and maintain the fluid pressure within the master cylinder.

5 Claims, 4 Drawing Sheets

BRAKE CONTROLLER

BACKGROUND OF THE INVENTION

The present invention relates to a brake controller for controlling a vehicle brake.

As a conventional function for assisting a restart of a slope climbing, there are a wheel cylinder pressure keeping with a fluid actuator and a parking brake utilization, as described in for example, JP-A-2006-306350.

BRIEF SUMMARY OF THE INVENTION

However, in the art described in JP-A-2006-306350, there are problems that a heating of the fluid actuator will be caused due to holding of a high fluid pressure which is required for vehicle stop and bad feeling will be suffered upon driver's pressing of a brake pedal during the fluid pressure holding. In a fluid pressure booster using an electric motor, if a wheel cylinder pressure is held a master cylinder pressure is abruptly elevated even with a minute brake pedal manipulation due to sealing of a brake fluid within the master cylinder. As a result, reconsideration for master cylinder pressure withstanding capability and measures for switching to control are required.

An object of the present invention is to provide a brake controller which improves user's feeling caused upon pressing of a brake pedal during fluid pressure holding, prevents abrupt elevation of a master cylinder pressure caused due to the minute brake pedal manipulation, and allows a fluid pressure change according to a manipulation to make it possible provide a manipulation like a normal brake. According to the invention, a brake controller comprises, an accelerator opening degree detecting means for detecting a pressing amount of an accelerator pedal, an input piston moving in accordance with a movement of a brake pedal, an assist piston moved by an electric motor, a master cylinder for generating a pressure of brake fluid in accordance with movements of the input piston and the assist piston, a slope climbing vehicle stopping detecting means for judging as to whether or not a vehicle is in stoppage during its slope climbing, a controller for controlling the electric motor, and a pedal release detecting means for detecting a release of the brake pedal, wherein when the slope climbing vehicle stopping detecting means decides that the vehicle is in stoppage during its slope climbing, and the pedal release detecting means detects that the brake pedal is released, the controller controls the electric motor to move the assist piston so that an amount of pressure decrease of the brake fluid caused by the movement of the input piston with the release movement of the brake pedal is compensated with the movement of the assist piston to restrain the pressure of brake fluid in the master cylinder from being decreased.

The present invention provides a brake controller which improves user's feeling caused upon pressing of a brake pedal during fluid pressure holding, prevents abrupt elevation of a master cylinder pressure caused due to the minute brake pedal manipulation, and makes it possible to provide a fluid pressure change according to a manipulation and a manipulation like a normal brake.

Other objects, features and advantages of the invention will become apparent from the following description of the embodiments of the invention taken in conjunction with the accompanying drawings.

Each of FIGS. 4(A)-4(E) is an illustration for explaining the relation between a piston and an input rod according the invention.

DETAILED DESCRIPTION OF THE INVENTION

Figure 1:
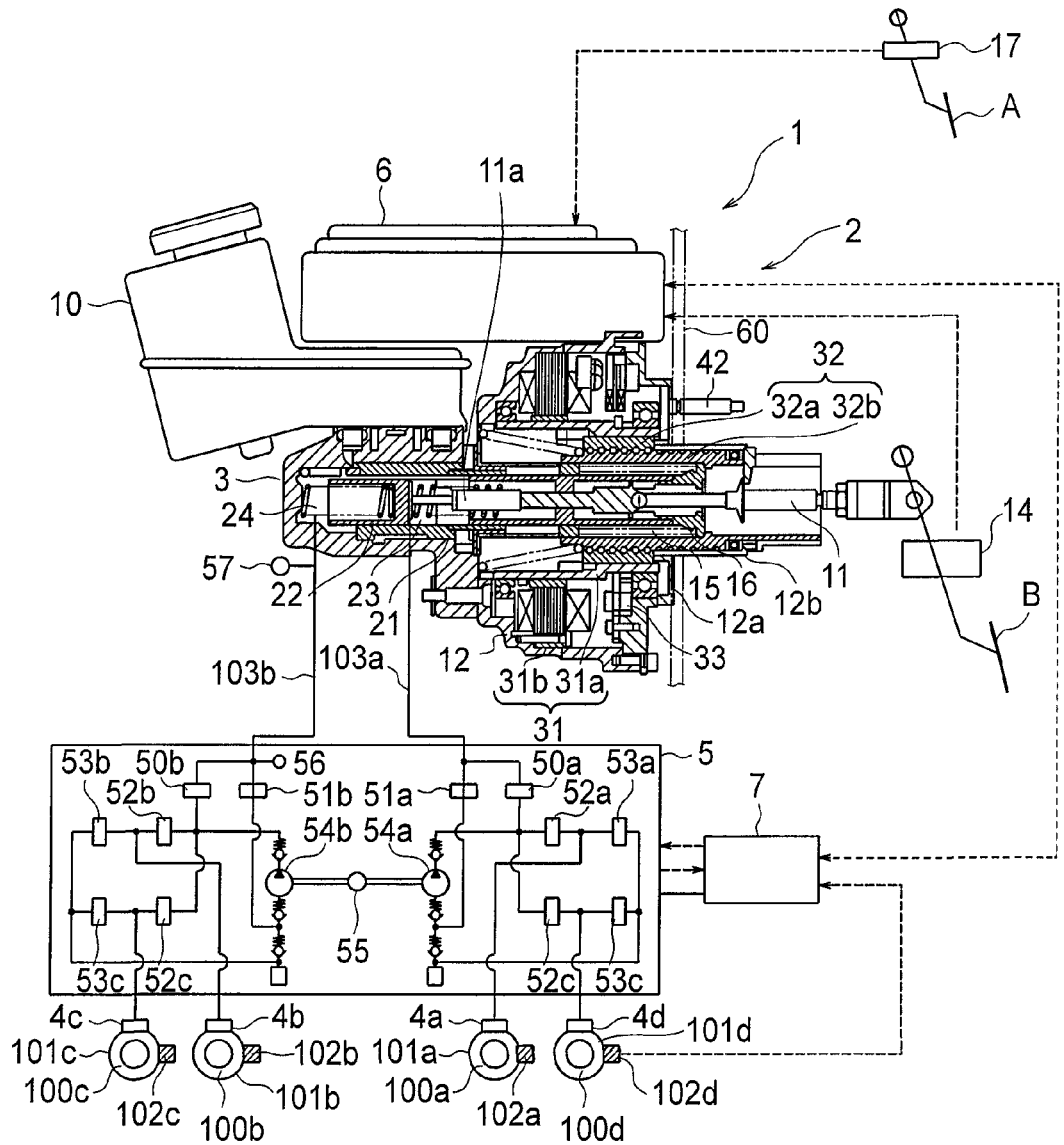
FIG. 1 is an illustration of one embodiment of a brake controller according to the present invention.

In the following, a brake controller for use in vehicles according to the present invention will be described with reference to FIGS. 1 to 4. FIG. 1 is a system block diagram showing one structural example of a brake controller for vehicle use according to one embodiment of the present invention.

In a vehicle brake apparatus 1 as a brake controller, a brake assistor 2, in response to an operation amount of a brake pedal B and a condition of vehicle travel a brake assisting device 2 controls a fluid pressure of a braking fluid caused by a master cylinder 3 based on a direction causing increase or decrease in operation force of the brake pedal B, and supplies a fluid pressure control unit 5 with the brake fluid having the thus-controlled fluid pressure.

In this embodiment, the fluid pressure of the braking fluid generated in the master cylinder 3 is transmitted to the fluid pressure control unit 5, and the fluid pressure of the braking fluid is further transmitted from the fluid pressure control unit 5 to wheel cylinders 4a to 4d of respective wheels. The wheel cylinders 4a to 4d generate braking forces against rotation of disc rotors 4a to 4d of the respective wheels 101a to 101d, respectively, thus generating braking forces to the vehicle.

The brake assistor 2 has a casing 12 for fixing the assistor 2 to a partition 60 as a vehicle member partitioning between an engine room and vehicle room of a vehicle body. Constitutional components of the brake assistor 2 are held in the above-mentioned casing 12. The components will be described later.

The above-mentioned casing 12 includes a fixed wall 12a and a cylinder part 12b. To the fixed wall 12a a plurality of fixing screws 42, three being in this embodiment, are provided equidistantly on a circumference having a center axis of the cylinder part 12b as its center, each equidistant being 120 degrees in angle in this embodiment.

FIG. 1 briefly shows the partition 60 partitioning between the engine room and the vehicle room. However, in the drawing of the fixed wall 12a, by attaching the partition 60 closely to the right surface of the fixed wall and fastening them with the fixing screws 42, the casing 12 is fixed to the partition 60. A portion positioned on the left side of the brake assistor 2 relative to the fixed wall 12a exists on the side of the engine room relative to the partition. The cylinder part 12b which is a portion positioned on the right side of the brake assistor 2 relative to the fixed wall 12a from a hole formed in the partition protrudes into the vehicle room.

The master cylinder 3 is fixed to the casing 12 and further holds a reservoir tank 10 storing a braking fluid. The reservoir tank 10 is disposed in a space between the master cylinder 3 and an assist control unit 6 described later, thereby providing an advantage that the overall brake assistor 2 can be made compact in size.

In this embodiment, the master cylinder 3 is in a tandem type, and includes inside a primary fluid chamber 23 and a secondary fluid chamber 24. From the primary fluid chamber 23 and the secondary fluid chamber 24 fluid pressures of brake fluid having a substantially same pressure are output. That is, braking fluid pressures having the same pressure are output from the primary fluid chamber 23 and the secondary fluid chamber 24, so that fluid pressures of two-system braking fluids are available, thereby improving the safety and the reliability. The two-system fluid pressures are transmitted to fluid control unit 5, respectively.

The casing 12 of the brake assistor 2 includes in the inner portion, an input rod 11, an input piston 11a provided at the tip of the input rod 11, an assist pin 21, a motor (electric motor) 31 acting as an electric actuator, and a rotation-to-linear motion converting mechanism 32 for converting a rotating motion of the motor 31 to a linear motion.

The input rod 11 is mechanically coupled with the brake pedal B provided in the vehicle room and is moved toward the left side or right side of FIG. 1 based on a pressing operation of the brake pedal B.

When a driver depresses the brake pedal B, the input rod 11 is moved from the right side of FIG. 1 toward the left side. In other words, the input rod 11 is moved from the side of the vehicle room toward the engine room, whereby an input rod 11a provided on the master cylinder of the input rod 11 applies a pressure to a braking fluid in the primary fluid chamber 23 of the master cylinder 3.

The secondary piston 22 acts to make the fluid pressures of the primary fluid chamber 23 and the secondary fluid chamber 24 equal, so that the primary fluid chamber 23 is pressurized by the input piston 11a, and the fluid pressure of the secondary piston 22 is also pressurized in the like manner.

A pressing amount of an accelerator pedal A is detected by a accelerator open-degree detecting means 17. An operating amount of a brake pedal B is detected by a stroke sensor 14. The detection value is input to the assist control unit 6 and an AC power is supplied from the assist control unit 6 to a stator 31b of a motor 31 so as to generate a braking force based on the operating amount. Based on the AC power a rotation torque is generated in a rotor 31b of the motor 31 serving as an electric actuator, the generated rotation torque is transmitted to the rotation-to-linear motion converting mechanism 32 for converting rotating motion into linear motion, and a rotational movement amount of the rotor 31a of the motor 31 is converted into a linear movement amount to thereby move the assist piston 21 in the left direction on FIG. 1. The assist piston 21 acting as a primary piston to the primary chamber 23 of the master cylinder 3, and the braking fluid is pressurized based on a moving amount of the assist piston.

The secondary piston 22 of the secondary fluid chamber 24 in the master cylinder 3 is a free piston which is fundamentally freely movable, provided that friction and a spring action for characteristic improvement are ignored. The secondary piston 22 moves toward the left side of FIG. 1 based on an increase in the fluid pressure of the primary fluid chamber 23. Since the secondary piston 22 is moved so that the fluid pressures of the primary fluid chamber 23 and the secondary fluid chamber 24 may be substantially equal, both of the fluid pressure of the primary fluid chamber 23 and the fluid pressure of the secondary fluid chamber 24 are pressurized based on movement of the assist piston 21 acting as a primary piston, and braking fluid pressures which are substantially equal with each other from the primary fluid chamber 23 and the secondary fluid chamber 24 are output through a master conduit 103a and a master conduit 103b.

For the operating amount of the brake pedal B a pressing pressure of the brake pedal B may be detected. Alternatively, the pressing amount of the brake pedal B may be detected. The assist control unit 6 arithmetically operates a target braking force using the above-mentioned operating amount of the brake pedal B as a parameter to thereby control the motor 31 which is the electric actuator.

In this embodiment, a pedal pressing amount as the operating amount of the brake pedal B is detected by a stroke sensor 14, and the detected pressing amount is used as control parameter to thereby arithmetically operate the target braking force. The reason why the pedal pressing amount of brake pedal B is used as the control parameter is that the pressing amount of the brake pedal B is provided by detecting a moving amount of the input rod 11, so that the pedal pressing amount can be detected with high precision and relatively easily compared to detection of pedal pressing pressure.

For the motor 31a DC motor, a DC brushless motor, or an Ac motor may be used. Among those motors, use of the DC motor or DC brushless motor may be preferable because a vehicle-use power supply is DC power. The DC motor needs a commutator (i.e., brush). The DC brushless motor is most preferable for use from viewpoints of durability, reliability, controllability and quietness.

DC brushless motors have some different kinds. In this embodiment, from the viewpoint that the motor may preferably be small in size and provide a large output, the DC brushless motor includes a stator having three-phase windings and a rotor having a permanent magnet by which magnetic poles are formed (hereunder referred as "permanent magnet motor"). For the permanent magnet a neodymium magnet is most preferable, but a ferrite magnet may also be available.

The assist control unit 6 determines a target braking force based on control parameters, and performs position control of the assist piston 21 so as to generate a fluid pressure of a braking fluid corresponding to the determined target braking force in the master cylinder. Detailed control contents will be described later. When the brake pedal B is operated, the stroke sensor 14 or the like measures an operation amount, and thereby the motor 31 is driven so that the difference in relative position between, for example, the input piston 11a and the assist piston 21 may be reduced based on the difference in relative position.

In order to perform position control of the assist piston 21 by the motor 31 as mentioned above the assist control unit 6 determines a target rotation speed and a target rotation amount of the motor 31 and supplies three-phase AC power from an inverter circuit built in the assist control unit 6 so that the rotation speed of the motor 31 may become the determined target rotation speed.

The assist piston 21 moves toward the master cylinder based on the rotation motion of the motor 31, so that the fluid pressure of the braking fluid in the master cylinder increases. The fluid pressure of the braking fluid becomes a braking force generated by the wheel cylinders 4a-4d mentioned above. As a result, the braking force increases based on the movement of the assist piston 21.

As described later, the moving amount of the assist piston 21 is controlled based on the target rotation amount or the target turning angle of the motor 31. The assist control unit 6 controls the rotation amount, that is, the turning angle of the motor 31 based on a signal from a position sensor 33 such as a resolver which detects the position of the rotor 31a so that the actual moving amount may be become the target moving amount or the target turning angle.

The assist control unit 6 uses the operation amount of brake pedal B and the running condition as control parameters in the case of this embodiment.

As described above, in order to control the rotation amount of the motor 31, a magnetic pole of the rotor 31a is detected from the position sensor 33 for detecting the position of magnetic pole of the rotor 31a in the motor 31, and a signal indicating the position of the magnetic pole is output.

The assist control unit 6 receives the above-mentioned output signal, and calculates the turning angle or rotation amount of rotor 31a of the motor 31 based on the received signal, and calculates a driving or propelling amount of the rotation-to-linear motion converting mechanism 32, that is, the actual displacement amount of the assist piston 21 based on the calculated turning angle. The assist control unit 6 controls the motor 31 so that the actual displacement amount of the assist piston 21 may approach a target displacement amount which is the target moving amount of the assist piston 21.

For the mechanism for converting a rotating motion into a linear motion or converting a linear motion into a rotating motion (referred to as "rotation-to-linear motion converting mechanism 32" hereafter), for example a rack and pinion, a ball-feed screw or the like is available. For the relation with the moving distance of the assist piston 21a system using ball-feed screw is preferable, and is employed in this embodiment.

In this embodiment, the rotor 31a of the motor 31 is in a hollow shape. The input piston 11a and the assist piston 21 pass through a hollow portion of the interior of the rotor 31a. The inner circumference of the rotor 31a is engaged with the outer circumference of a ball-feed screw and nut 32a.

The rotor 31a of the motor 31 is rotatable, but is held by a bearing so as to lock the rotor from moving in axial directions of the input piston 11a and the assist piston 21. The ball-feed screw and nut 32a is also rotatable, but is disabled from moving in the above-mentioned axial directions.

When the ball-feed screw and nut 32a rotates toward one side with rotation of the rotor 31a, a ball screw axis 32b moves in the axial direction toward the master cylinder 3 and a projection provided in the ball screw axis 32b pushes the assist piston 21 toward the master cylinder 3.

With this propelling force, the assist piston 21 is stressed in the direction of the master cylinder 3 to increase the fluid pressure of the primary chamber 23 of the master cylinder 3. The fluid pressure of the secondary chamber 24 is changed so as to be substantially same as that of the primary fluid chamber 23, so that the fluid pressure generated from the secondary chamber 24 also increases at that time.

The assist piston 21 is stressed to the projection of the ball screw axis 32b by a spring. When the ball screw and nut 32a is rotated toward the other side, the ball screw axis 32b is moved toward the right side of FIG. 1, namely, in a direction opposite to the master cylinder 3, and the projection is moved toward the right side of FIG. 1. As a result, the assist piston 21 is moved by force of the spring in a direction opposite to that of the master cylinder 3 which is the right direction on FIG. 1. In this case, the output fluid pressures of the primary fluid chamber 23 and the secondary fluid chamber 24 of the master cylinder 3 both are decreased.

A movable member 16 is engaged with one end of a return spring 15 on one side of the member, and is configured such that a force reverse to propelling force of the ball screw axis 32b acts on the ball screw axis 32b. Thereby, during braking, that is, upon the primary fluid chamber 23 and the secondary fluid chamber 24 being pressurized with stressing of assist piston 21, if return control of the ball screw axis 32b is disabled due to for example, a failure of motor 31 or the like, the ball screw axis 32b can be returned to its initial position by a reaction force of the return spring 15. Thus, respective fluid pressures (master cylinder pressure) of the primary fluid chamber 23 and the secondary fluid chamber 24 can be decreased to those close to substantially zero. For example, instability of vehicle behavior due to brake dragging can be avoided.

The increased fluid pressures of the primary fluid chamber 23 and the secondary fluid chamber 24 are transmitted to the wheel cylinders 4a-4b through the master conduits 103a-103b. The wheel cylinders 4a-4b each comprise a cylinder, a piston and a pad which are not shown. The piston is propelled by operating fluid fed from the primary fluid chamber 23 and the secondary fluid chamber 24 and then stresses the pad against the disc loaders 101a-101d to provide braking force.

Next, description will be made of a principle for amplifying the propelling force of the input rod 11 by driving the motor 31 using the assist control unit 6. In the embodiment, as described above, the input rod 11 responsive to pressing on the brake pedal B is displaced to the assist piston 21 toward the master cylinder 3. According to the displacement, the motor 31 is driven in such a direction that the displacement, that is, the difference in relative position between the input rod 11 and the assist control piston 21 will be decreased, the assist piston 21 is moved toward the side of the master cylinder 3, and thus, the primary fluid chamber 23 is pressurized.

Amplification ratio of output fluid pressure of the master cylinder 3 (hereafter referred to as "energizing ratio") is determined to be the ratio in displacement between input rod 11 and assist piston 21, the ratio in sectional area between input rod 11 and assist piston 21, or the like.

Particularly, when the assist piston 21 is displaced by the same amount as the displacement of input rod 11, it is known that an energizing ratio (N/N) is uniquely determined by the following Expression (1) from a sectional area AIR of input rod 11 and the sectional area APP of assist piston 21:

$$N/N = (AIR + APP)/AIR \quad (1)$$

That is, if based on a necessary energizing ratio, the sectional area AIR of input rod 11 and the sectional area APP of assist piston 21 are set, and the displacement of assist piston 21 is controlled so as to become equal to the displacement of the input rod 11, a constant energizing ratio is always provided.

As described above, the displacement amount of input rod 11 is detected by the stroke sensor 14, and the displacement amount of assist piston 21 is calculated by the assist control unit 6 based on a signal from position sensor 33 provided in motor 31.

Description will next be made of an amplifying (energizing) variable control processing. The amplifying variable control processing is defined as a control processing which provides assist piston 21 with a displacement having an amount obtained by multiplying a displacement of input rod 11 and a proportional gain K1. Here, the proportional gain K1 is desirably 1 on controllability (K1=1). However, when a braking force greater than a driver's brake operation amount at an emergency brake operation or the like is required the proportional gain K1 can be instantly changed to a value exceeding 1. Thereby, a greater braking force can be generated by elevating the master pressure relative to the normal operation (at K1=1) with the same brake operation amount as provided by the driver. Whether or not to require the emergency brake operation is determined by for example, determining whether the time change rate of a signal indicative of a brake operation amount detected from the stroke sensor 14 exceeds a predetermined value or not.

According to the above-mentioned amplifying variable control processing the master pressure can be increased or decreased depending upon the displacement of the input rod 11 at driver's request for braking. Therefore, the braking force as requested by the driver can be generated.

By changing the proportional gain K1 to a value smaller than 1 (K1<1) the invention can be applied to a regenerationcooperated brake control which deceases the pressure of the fluid pressure brake by a regeneration braking force in a hybrid vehicle (car).

Subsequently, description will be made of a processing in carrying out an automatic braking function. The automatic brake control processing is a control processing which makes the assist piston 21 move forward or backward so as to adjust the operation pressure of the master cylinder 3 at a required fluid pressure of (hereafter referred to as "automatic brake required fluid pressure").

In a method for controlling the assist piston 21, the assist control unit 6 stores a data table indicative of the relation between the previously acquired displacement amount of the assist piston 21 and the output fluid pressure of the master cylinder 3 (abbreviated as "master pressure"). An output fluid pressure of the master cylinder 3 required for an automatic brake is calculated based on the data table. Then, a displacement amount of assist piston 21 required to implement the calculated output fluid pressure is determined from the stored data table. The determined displacement amount is used as a target value, and the assist control unit 6 drives the motor 31 to control the motor 31 so that the displacement amount of the assist piston 21 may be equal to the target value.

In another control method, a fluid pressure sensor 57 for detecting an output fluid pressure of the master cylinder 3 (hereafter referred to as "master pressure sensor") is provided on the output side of the mater cylinder 3. When the above-mentioned required output fluid pressure of master cylinder 3 is calculated, the assist control unit 6 controls the motor 31 so that an output fluid pressure of the master cylinder 3 may be equal to the calculated fluid pressure.

Thus, a method for performing a feedback to the assist control unit 6 using a master pressure detected by a master pressure sensor 56 can also be used.

The required fluid pressure of automatic brake can be received from an external unit. The automatic brake function may be used in association with brake control in vehicle tracking control, lane departure avoidance control, obstacle avoiding control or the like.

The controller 7 calculates a target brake force generated in each wheel based on a inter-vehicle distance relative to an input ahead vehicle, road information, vehicle condition amount, for example yaw rate, forward and backward acceleration, transverse acceleration, steering angle, wheel velocity and vehicle velocity, and controls the fluid pressure control unit 5 based on the results thus calculated. The fluid pressure control unit 5 controls the fluid pressure of the braking fluid which is fed to respective wheel cylinders 4a to 4d, in accordance with a control instruction of the controller 7 for controlling the fluid pressure control unit 5. The fluid pressure control unit 5 comprises gate OUT valves 50a and 50b for controlling feed of an operating fluid pressurized by the master cylinder 3, to respective wheel cylinders 4a to 4d; gate IN valves 51a and 51b for controlling feed of the fluid to pumps 54a and 54b; IN valves 52a and 52b for controlling feed of the operating fluid to wheel cylinders 4a to 4d from the master cylinder 3 or the pumps 54a and 54b; OUT valves 53a and 53b for controlling to depressurize the fluid pressure to the wheel cylinders 4a to 4d; the pumps 54a, 54b boosting the master pressure generated in the master cylinder 3; a pump-driving motor 55 for driving the pumps 54a, 54b; and the master pressure sensor 56 for detecting the master pressure.

Here, the master pressure sensor 56 detects the master pressure which is used for control by the assist control unit 6 and control by the controller 7. A fluid pressure sensor is supplied with a power voltage from a control circuit using the fluid pressure, and supplies an output voltage based on the fluid pressure to the supplied power voltage. The control circuit senses the fluid pressure from the supplied power voltage and the output voltage. Thus, even when objects to be detected are same, it is desirable to improve the precision of detection that respective fluid pressure sensors are provided for the respective control circuits.

The fluid pressure control unit 5 performs anti-lock brake control (ABS) and vehicle behavior stabilization control (VSA). The fluid pressure control unit 5 includes two systems which are a first brake system such that an operating fluid is fed from the primary fluid chamber 23 to control a brake force to front-left (FL) wheel 100a and rear right (RR) wheel 100b; and a second brake system such that that an operating fluid is fed from the secondary fluid chamber 24 to control a brake force to front-right (FR) wheel 100b and rear-left (RL) wheel 100c.

With such a configuration, even when one of the two brake systems is in a failure, the other brake system which operates normally ensures brake forces for two wheels which are located orthogonally relative to the vehicle truck, thus keeping the behavior of vehicle stable.

In FIG. 1, gate OUT valves 50a and 50b are provided between the master cylinder 3 and IN valves 52a to 52d, and are made open when the operating fluid pressurized in the master cylinder 3 is fed to the wheel cylinders 4a to 4d. Gate IN valves 51a and 51b are provided between the master cylinder 3 and pumps 54a to 54d, and are made open when the operating fluid pressurized in the master cylinder 3 is boosted by the pumps 54a to 54d and is fed to the wheel cylinders 4a to 4d. IN valves 52a to 52d are provided in an upstream of the wheel cylinders 4a to 4d, and are made open when the operating fluid pressurized in the master cylinder 3 is fed to the wheel cylinders 4a to 4d.

OUT valves 53a to 53d are provided in a downstream of the wheel cylinders 4a to 4d, and are made open when the wheel pressure is depressurized. The gate OUT valves 50a and 50b, the gate IN valves 51a and 51b, the IN valves 52a to 52d and the OUT valves 53a to 53d may be of an electromagnetic type. Each valve is individually adjusted in its opening amount by controlling amplification to a solenoid (not shown) of the valve individually.

The gate OUT valves 50a and 50b, the gate IN valves 51a and 51b, the IN valves 52a to 52d and the OUT valves 53a to 53d may be any of normally-open type and normally-closed type. In the first embodiment, the gate OUT valves 50a and 50b and the IN valves 52a to 52d are of normally-open type, and the gate IN valves 51a and 51b and the OUT valves 53a to 53d are of normally-closed type.

With employment of such a configuration, even when power supply to the respective valves is interrupted, the gate IN valves and gate OUT valves are closed and the gate OUT valves 50a and 50b and the IN valves 52a to 52d are open, and the operating fluid pressurized in the master cylinder 3 all reaches the wheel cylinders 4a to 4d, thus providing the baking force required by the driver as it is.

When the pressure exceeding the operating pressure of master cylinder 3 is required in order to perform, for example, vehicle behavior stabilization control, automatic braking or the like the pumps 54a and 54b boost the master pressure further, and feed the boosted master pressure to the wheel cylinders 4a to 4d. For the pumps 54a and 54b plunger pumps, trochoid pumps or gear pumps may be appropriate. The gear pumps are desirable from the point of quiet view.

The motor 55 is operated by electric power which is supplied based on a control instruction from the fluid pressure control unit 5 to drive the pumps 54a and 54b connected thereto. For the motor 55, a DC motor, a DC brushless motor or an AC motor is appropriate for use. The DC brushless motor is desirable from the viewpoint of controllability, quietness and durability.

The master pressure sensor 56 is provided in a downstream of the master conduit 103b on the secondary side, and is a pressure sensor for detecting the master pressure. The number and location of master pressure sensor 56 to be installed are not limited to the example indicated in FIG. 1, which may be determined taking into consideration controllability and fail-safe.

The assist control unit 6 can calculate a turning angle of the motor 31 based on a signal from the position sensor 33, and therefore, can calculate a displacement amount of a propelling amount of the rotation-to-linear motion converting mechanism 32, that is, a displacement amount of assist piston 21, based on the turning angle of the motor 31. The displacement amount of input rod 11 can be calculated from the value of the pedal stroke. Thus, the master pressure can be estimated from the stroke sensor 14 which detects the brake operation amount.

By comparing the estimated master pressure with the master fluid pressure detected by the sensor 56 the detection of operation failure is made possible which is the case where the assist piston 21 can not be operated by motor 31 due to a failure of the motor 31 itself or disconnection of power supply line.

By comparing the current value directly supplied to the motor 31 with the displacement amount of the motor a failure of the motor 31 is also detectable. In this manner, the assist control unit 6 can detect a faulty condition of the motor 31 from a current value and a voltage value supplied to the motor 31, an output value of stroke sensor 14 and an output of master pressure sensor 56. The controller 7 for controlling the fluid pressure control unit 5 can also detect a faulty condition of the fluid pressure control unit 5.

Wheel speed sensors 102a to 102d are provided in respective wheels 100a to 100d, and function as sensors for detecting respective wheel speeds. Wheel speed signals detected by the wheel speed sensors 102a to 102d are input to the controller 7 controlling the fluid pressure control unit 5, and are transmitted by an intra-vehicle communication network (CAN) to a brake assistor 2.

In the controller according to the present invention, as described above, the controller relating to a brake corresponds to the assist control unit 6 which is the amplifier control unit, and the controller relating to the fluid pressure control unit 5 corresponds to the controller 7 which is a control unit for use in the fluid pressure control unit.

Figure 2:
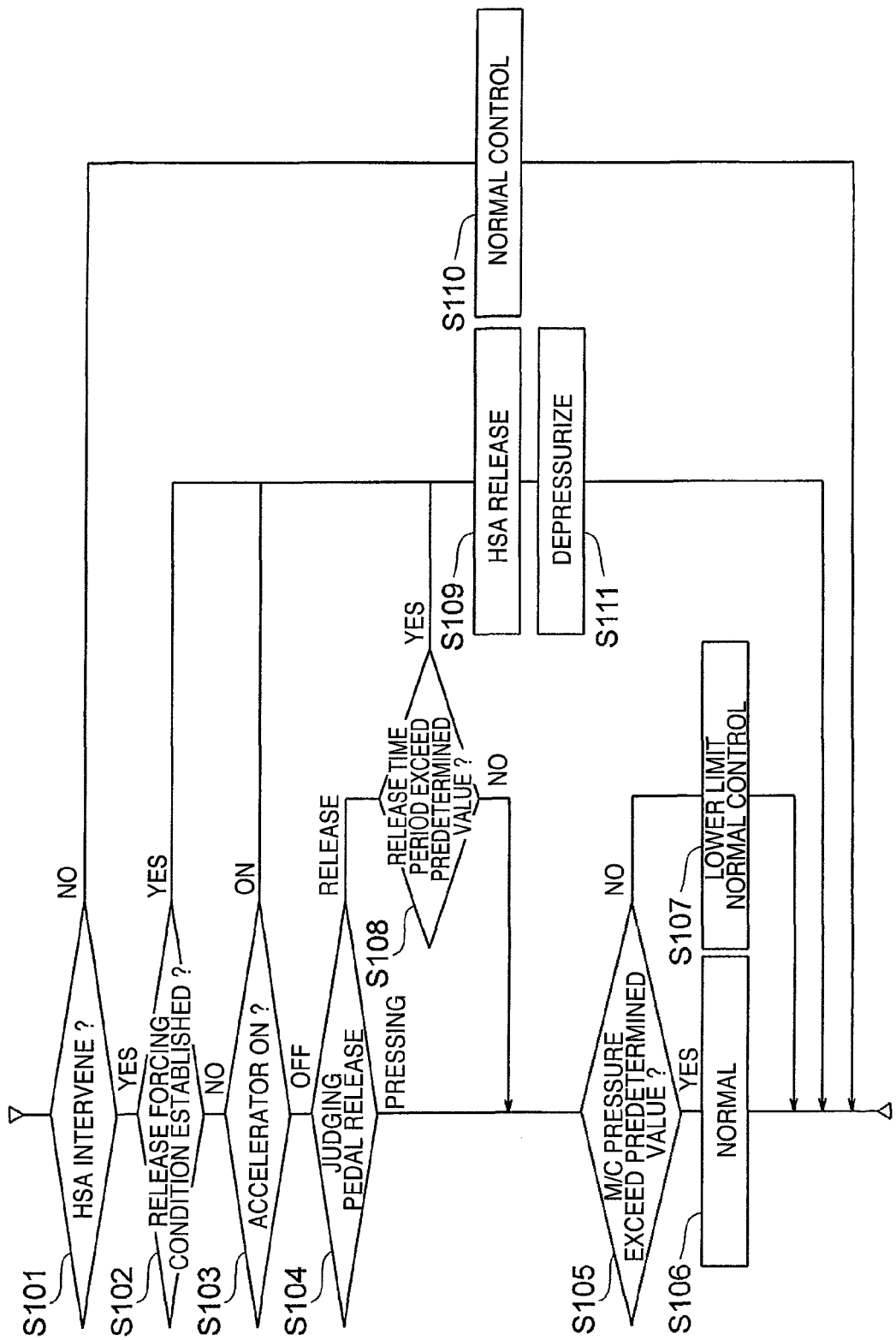
FIG. 2 is a flowchart showing control of a brake controller according to the present invention.

Referring to FIG. 2 one embodiment of control contents of the brake control device according the present invention will be described.

FIG. 2 is a flowchart of control indicating control contents of a brake controller.

A front rear (forward reverse) G sensor signal detected by a front rear G sensor and a wheel speed signal detected from a wheel speed sensor 102 mounted on each wheel are input to the controller 7 which is a control unit for use in the fluid pressure control unit, and transmitted to the assist control unit 6 which is the amplifier control unit, through vehicle LAN communication.

Based on these signals a decision as to whether to intervene in HSA is made in step 101 of an intervening decision HAS in step 101. HSA is an abbreviation of Hill Start Aid, which is a brake assist function such that a brake force upon vehicle stop is recorded and the stop condition is kept even when driver's foot is left from a brake pedal. For example, it is decided from the font and rear G sensor that a vehicle is during a slope climbing, and when the wheel speed sensors 102 of all of the wheels are zero, it is decided that the vehicle is during a stopping. This is decided by a climbing vehicle stopping detecting means within the assist control unit 6 based on detection results from the front rear G sensor and the wheel speed sensors 102. In addition, it is decided from the stroke sensor 14 that the brake is pressed, it is decided that a shift signal indicates the slope climbing, and it is decided from an accelerator op-opening degree signal detected by an accelerator opening-degree detection means 17 that an accelerator pedal is not pressed. These decisions are made together. When the decision result is non-intervening the process proceeds to step 110, in which the normal control is performed.

In step 101, if it is determined that HSA intervenes the process proceeds to step 102, and it is decided whether a release forcing condition is met.

In the decision of the release forcing condition in step 102, if the HSA function can not be maintained due to an abnormality or the like in the vehicle, HSA is released.

If the release forcing condition in step 102 is met, the process proceeds to a HSA release processing in step 109, and then a depressurizing processing is made in step 111.

In step 101, when it is decided that HSA is non-intervening, the process proceeds to step 110. In the step 110, a normal control is conducted such that the assist piston 21 which is driven by the motor 31 may be at a position of the assist piston 21 synchronized with the normal brake pedal.

In a depressurizing processing the depressurizing gradient can be made variable in accordance with an abnormal condition. Control is conducted such that the primary piston (assist piston 21) which is driven by the motor 31 may be at the position of the primary piston synchronized with the normal brake pedal.

In step 102, when the release forcing condition is not met, the process proceeds to step 103. In the step 103, it is decided whether the vehicle driver intends starting of the vehicle based on an accelerator opening-degree signal detected by the accelerator opening-degree detecting means 17. The drive torque required for starting of the vehicle can be calculated based on the value of the front rear G sensor transmitted from the assist control unit 6 and a preset vehicle weight, so that the decision is performed with a threshold value of accelerator opening-degree greater than the such calculated drive torque.

When the accelerator is determined to be ON, the process proceeds to step 109. In the step 111, a depressurizing processing is conducted. In the depressurizing processing, the depressurizing gradient can be made variable depending upon the accelerator opening-degree or the drive torque. Control is conducted such that the primary piston (assist piston 21) driven by the motor 31 has its position synchronized with the normal brake pedal.

When it is determined that the accelerator opening-degree signal is equal to or smaller than the threshold value so that the vehicle driver has no intention of starting, the process proceeds to step 104. In the step 104, the determination of pedal release is conducted.

In the pedal release determination in step 104, the pedal release is determined based on the relation in position between the assist piston 21 driven by the motor 31 and the input rod 11 calculated from the stroke sensor 14 installed in the brake pedal B. In short, the pedal release detection means detects that the pedal has been retuned back. This is determined based on the relation in position between the assist piston 21 and the stroke sensor 14. The value of stroke sensor 14 has a possibility that the pedal stroke will not return to zero depending upon the position of the assist piston 21. Therefore, the position of assist piston 21 is used as a reference. The value of stroke sensor 14 is converted into the position of input rod 11. The position of the input rod 11 is determined as a relative position. For example, when the relative position is equal to or larger than 10 mm, a pedal release is determined. The value of 10 mm is designed as a mechanical value. Each of FIGS. 4(A) to 4(E) shows the relation in position between the assist piston 21 and the input rod 11.

Figure 4A:
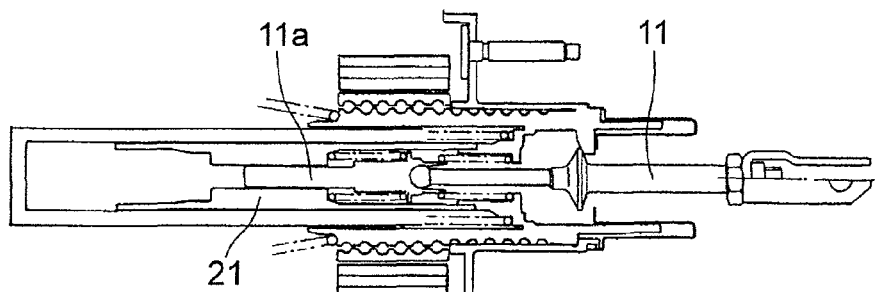
Figure 4B:
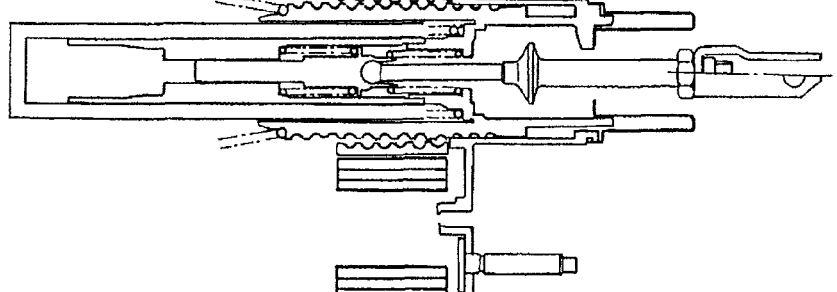
Figure 4C:
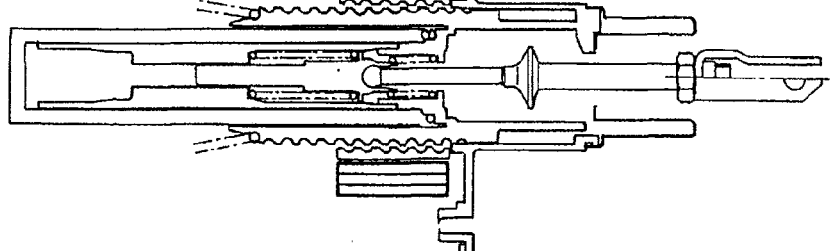
Figure 4D:
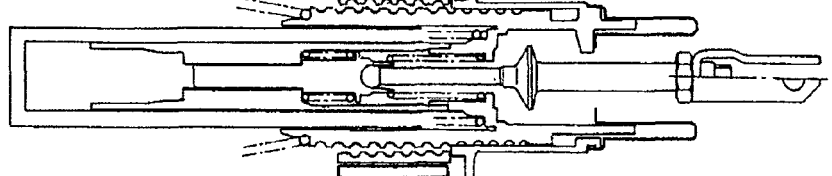
Figure 4E:
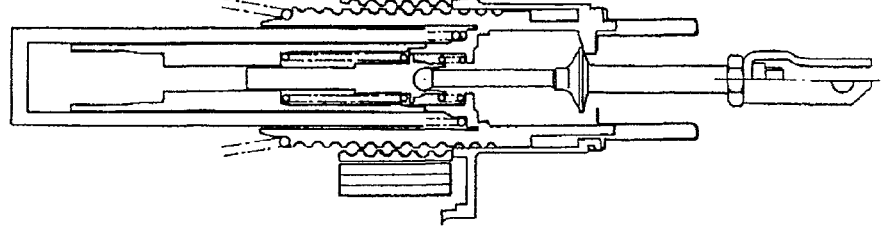

FIG. 4(A) shows a state in which the brake pedal is not pressed down. FIG. 4(B) shows equal-times control which represents a normal brake control. This indicates a state that the assist piston 21 is advanced synchronously with the input rod 11 synchronized with the brake pedal. FIG. 4(C) shows a state in which the state of FIG. 4(B) is further amplified. FIG. 4(D) shows the case of low amplification. The state of FIG. 4(C) is used as a brake assist function used for emergency avoidance. The state of FIG. 4(D) is used for regeneration cooperative control in a hybrid vehicle or the like. FIG. 4(E) shows the positional relation when the brake pedal is released during HSA. By holding the fluid pressure using the assist piston 21 to release the brake pedal, the input rod 11 is returned back to the constant position. As a result, the value of stroke sensor 14 is also returned back to the release position, thus conducting the release determination.

Figure 3:
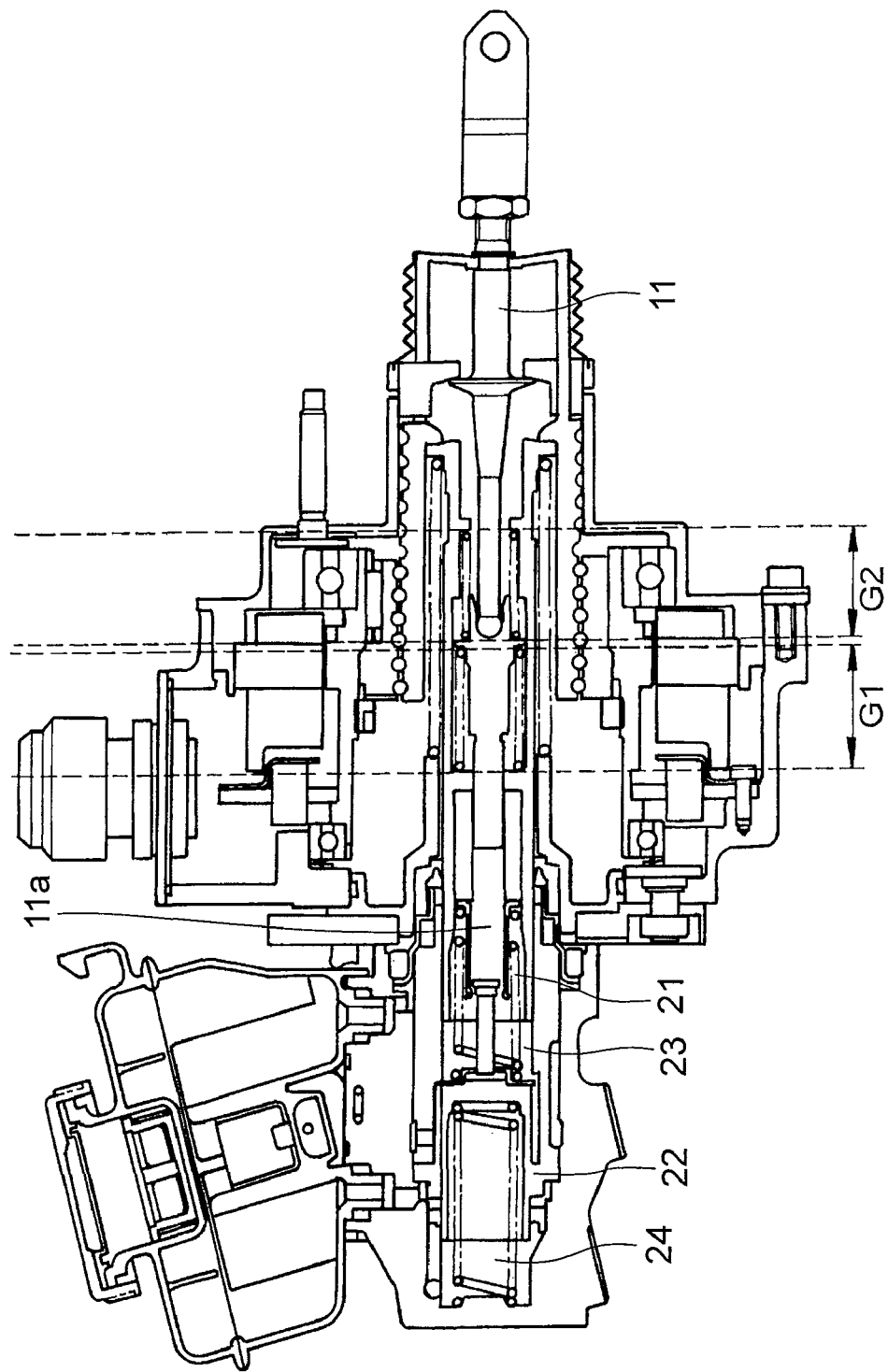
FIG. 3 is an illustration for explaining a moving amount of a piston driven by a motor according the invention.

However, the movement amount of assist piston 21 driven by the motor is restricted to the movement amount of from G1 to G2 shown in FIG. 3 in contrast to the input rod 11 moving synchronously with the brake pedal. G1 is the movement amount on a highly amplified side, and G2 is the movement amount on a lowly amplified side. The movement amounts are determined based on the amplifying performance upon brake assist for emergency avoidance or the like and the regeneration amount in the regeneration cooperative control. Thereby, in a state where the assist piston 21 is advanced the input rod 11 is returned only up to the movement amount on a lowly amplified side. In short, even when the vehicle driver released the brake pedal completely, the normal full released position would not return back. In such a condition, it is determined that a pedal release is achieved, relying on the fact that the input rod 11 is returned only up to the movement amount on a lowly amplified side.

When it is determined that a pedal release is achieved, fluid control is conducted so as to hold a master cylinder pressure calculated by the master pressure sensor 56 in the step 108 in FIG. 2. For example, even when the detection result of the stroke sensor 14 is that the brake pedal is released, the master cylinder pressure is held at the pressure by HSA intervention through the assist piston 21 driven by the motor 31. When a predetermined period of time lapses with retention of the master cylinder pressure the process proceeds to step 109.

When the release time in the step 108 lapses by a predetermined time, the process proceeds to release of HSA in the step 109. Depressurizing processing is conducted in step 111. When it is determined that the depressurizing processing has been completed in step 111 and HSA is non-intervening in step 101, the process proceeds to step 110. In the step 110, Control is conducted such that the primary piston (assist piston 21) which is driven by the motor 31 may be at the position of the primary piston synchronized with the normal brake pedal. Control is conducted such that the assist piston 21 which is driven by the motor 31 may be at the position of the assist piston 21 synchronized with the normal brake pedal.

In step 108, when the release time is within a predetermined time, the master cylinder pressure is held. However, when the master cylinder pressure exceeds a predetermined value, it is possible to conduct the normal control (step 106).

In step 105, when HSA holding fluid pressure (master cylinder pressure) exceeds a predetermined value, the normal control synchronous with the brake pedal is conducted in step 106. Thereby, the unnecessary large fluid pressure is not to be held, so that the heating of the motor can be suppressed. Further, normal brake control becomes possible, so that feeling of brake pedal becomes the normal condition.

In step 105, when the HSA holding fluid pressure (master cylinder pressure) does not exceeds a preset cylinder pressure given value, a predetermined master cylinder pressure is held as a lower limit in step 107. For example, when a fluid pressure of 8 MPa is generated upon stopping of the vehicle during the slope climbing and the driver begins to release the brake pedal, the fluid pressure is held at the preset 4 MPa. Even when the brake pedal is released completely, the fluid pressure continues to be held at 4 MPa. The preset fluid pressure is a fluid pressure capable of keeping the vehicle stop or immobile. The preset fluid pressure can be calculated from the forward and backward G to be made variable.

As described above, in the present invention, when the slope climbing vehicle stop detecting means determines that the vehicle is stopped during the slope climbing and the pedal release detecting means determines that the pedal is released, the assist control unit 6 holds the fluid pressure within the master cylinder by interpolating a decrement in the fluid pressure caused due to the input piston 11a moving based on operation of the brake pedal, by the assist piston 21 through control of the electric motor. Further, when the master cylinder pressure detected by the master pressure sensor 56 exceeds a predetermined given value, the motor controlled based on operation of the brake pedal B is controlled to control the fluid pressure within the master cylinder 3 through the assist piston 21.

Further, when, after the fluid pressure within the master cylinder 3 is held, the accelerator opening degree detected by the slope climbing vehicle stop detecting means 17 is not more than a predetermined given value so that the slope climbing vehicle stop detecting means 17 determines that the vehicle does not stop, the motor is controlled to increase with the assist piston 21 increments the fluid pressure within the master cylinder 3 until the slope climbing vehicle stop detecting means 17 determines that the vehicle is stopped. When, after the fluid pressure within the master is held, the accelerator opening degree detected by the slope climbing vehicle stop detecting means 17 exceeds the predetermined given value, it is configured that the motor is controlled to decrease with the assist piston 21 the fluid pressure within the master cylinder 3.

With such a configuration, a brake controller is provided such that the feeling when pressing the brake pedal during retention of the fluid pressure is improved, the master cylinder pressure is prevented from abruptly rising with a minute brake pedal operation, and the fluid pressure change depending upon the brake pedal operation is possible, and it is possible to make like operation for the normal brake.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A brake controller, comprising:
an accelerator opening degree detecting means for detecting a pressing amount of an accelerator pedal;
an input piston that is moved in accordance with a movement of a brake pedal;
an assist piston that is moved by an electric motor;

a master cylinder for generating therein a pressure of brake fluid in accordance with movements of the input piston and the assist piston;

a slope climbing vehicle stopping detecting means for determining whether a vehicle has stopped while climbing a slope;

a controller for controlling the electric motor; and a pedal release detecting means for detecting a release of the brake pedal;

wherein when i) the slope climbing vehicle stopping detecting means determines that the vehicle has stopped while climbing a slope, and ii) the pedal release detecting means detects that the brake pedal is released, the controller controls the electric motor to move the assist piston so that an amount of a pressure decrease of the brake fluid caused by movement of the input piston during a release movement of the brake pedal is compensated by a movement of the assist piston to overcome said pressure decrease of brake fluid in the master cylinder.

2. The brake controller according to claim 1, further comprising:

a master pressure sensor for detecting the pressure of brake fluid in the master cylinder;

wherein when i) the slope climbing vehicle stopping detecting means determines that the vehicle has stopped while climbing a slope, ii) the pedal release detecting means detects that the brake pedal is released, and iii) the pressure of brake fluid in the master cylinder detected by the master pressure sensor equals or exceeds a predetermined value, the controller controls the electric motor in accordance with the release movement of the brake pedal to move the assist piston so that pressure of brake fluid in the master cylinder is adjusted with the movement of the assist piston.

3. The brake controller according to claim 1, further comprising:

a master pressure sensor for detecting the pressure of brake fluid in the master cylinder;

wherein when i) the slope climbing vehicle stopping detecting means determines that the vehicle has stopped while climbing a slope, ii) the pedal release detecting means detects that the brake pedal is released, and iii) the pressure of brake fluid in the master cylinder detected by the master pressure sensor is less than a predetermined value, the controller controls the electric motor to move the assist piston so that the amount of pressure decrease of the brake fluid caused by the movement of the input piston with the release movement of the brake pedal is compensated by the movement of the assist piston to overcome said pressure decrease of brake fluid in the master cylinder.

4. The brake controller according to claim 1, wherein when, after maintaining the pressure of brake fluid in the master cylinder to restrain a movement of the vehicle, i) the pressing amount of the accelerator pedal detected by the accelerator opening degree detecting means is less than a preset value and ii) the slope climbing vehicle stopping detecting means determines that the vehicle has not stopped while climbing a slope, the controller controls the electric motor to move the assist piston so that the pressure of brake fluid in the master cylinder is increased until the slope climbing vehicle stopping detecting means determines that the vehicle has stopped during its slope climbing.

5. The brake controller according to claim 1, wherein when, after maintaining the pressure of brake fluid in the master cylinder to restrain a movement of the vehicle, the pressing amount of the accelerator pedal detected by the accelerator opening degree detecting means equals or exceeds a preset value, the controller controls the electric motor to move the assist piston so that the pressure of brake fluid in the master cylinder is decreased.

* * * * *